Patented May 13, 1930

1,758,145

UNITED STATES PATENT OFFICE

WILLIAM HENRY CLUTTERBUCK, OF SALFORD, ENGLAND

PROCESS FOR PREVENTING THE SETTLING OUT OF PASTE DYESTUFFS

No Drawing. Application filed January 2, 1929, Serial No. 329,967, and in Great Britain February 1, 1928.

This invention relates an improved process for preventing the settling out of paste dyestuffs.

It is known that when many dye pastes, especially those of the vat colours are left standing for any considerable period they have a tendency to settle and lose their homogenity so that a sample taken therefrom is not quite representative of the whole mass and moreover, if the paste is not well stirred or mixed before using, faulty or uneven dyeing will result and although many processes have been proposed for the admixture with the dye paste of other substances most of these have the disadvantage that the dyeing properties of the paste are affected to a greater or less extent.

These objections are overcome by the present invention which consists in shaking, mixing or otherwise incorporating with the colour paste of a relatively small quantity of the natural colloidal clay known as bentonite, which produces an emulsification of the colour paste which will remain perfectly homogeneous and give no settling after standing for long periods and the dyeing properties of which will not be affected.

The bentonite may be added either in the dry state or it may first be mixed with water and then added to the paste dyestuffs.

Suitable proportions of bentonite to the colour paste are one part by weight of the clay to from fifty to two hundred parts of the dye paste, the whole being well mixed or stirred together.

Although the invention is particularly applicable to vat colours, it may also be applied to other colour pastes which have a tendency to settle out on standing for long periods.

What I claim as my invention and desire to protect by Letters Patent is:—

1. Process for preventing the settling out of paste dyestuffs which consists in incorporating a relatively small quantity of the natural colloidal clay known as bentonite with the paste dyestuff to produce an emulsification of the latter and cause it to remain homogeneous and give no settling after standing for long periods.

2. Process for preventing the settling out of paste dyestuffs which consists in incorporating a relatively small quantity of the natural colloidal clay known as bentonite mixed with water with the paste dyestuff to produce an emulsification of the latter and cause it to remain homogeneous and give no settling after standing for long periods.

3. Process for preventing the settling out of paste dyestuffs which consists in incorporating one part of the natural colloidal clay known as bentonite mixed with water with from fifty to two hundred parts by weight of the paste dyestuff to produce an emulsification of the latter and cause it to remain homogeneous and give no settling after standing for long periods.

4. A paste dyestuff such as a vat colour having a tendency to settle out on long standing having incorporated with it a relatively small quantity of the natural colloidal clay known as bentonite.

In testimony whereof I have hereunto set my hand.

WILLIAM HENRY CLUTTERBUCK.